US009059838B2

(12) United States Patent
Coomer

(10) Patent No.: US 9,059,838 B2
(45) Date of Patent: Jun. 16, 2015

(54) ENCRYPTION ALGORITHM WITH RANDOMIZED BUFFER

(75) Inventor: Brad Coomer, Roanoke, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2103 days.

(21) Appl. No.: 11/694,041

(22) Filed: Mar. 30, 2007

(65) Prior Publication Data

US 2011/0182419 A1     Jul. 28, 2011

(51) Int. Cl.
| H04K 1/00 | (2006.01) |
| H04L 9/00 | (2006.01) |
| H04L 9/38 | (2006.01) |
| H04L 9/06 | (2006.01) |
| H04L 9/28 | (2006.01) |
| H04L 9/08 | (2006.01) |

(52) U.S. Cl.
CPC ............... *H04L 9/0662* (2013.01); *H04L 9/28* (2013.01); *H04L 9/0656* (2013.01); *H04L 2209/20* (2013.01); *H04L 9/0891* (2013.01)

(58) Field of Classification Search
None
See application file for complete search history.

(56) References Cited

U.S. PATENT DOCUMENTS

| 5,420,926 | A | * | 5/1995 | Low et al. ....................... 705/74 |
| 6,088,456 | A | * | 7/2000 | McCracken et al. .......... 380/259 |
| 6,480,605 | B1 | * | 11/2002 | Uchiyama et al. .............. 380/30 |
| 7,260,552 | B2 | * | 8/2007 | Riera Jorba et al. ............ 705/12 |
| 7,317,394 | B2 | * | 1/2008 | Koh et al. .................. 340/572.1 |
| 7,346,769 | B2 | * | 3/2008 | Forlenza et al. .............. 713/151 |
| 7,356,140 | B2 | * | 4/2008 | Imai et al. ....................... 380/30 |
| 7,773,747 | B2 | * | 8/2010 | Akiyama et al. ................ 380/30 |
| 7,844,051 | B2 | * | 11/2010 | Brown et al. ................... 380/30 |
| 8,180,051 | B1 | * | 5/2012 | O'Toole, Jr. .................. 380/255 |
| 8,713,245 | B2 | * | 4/2014 | Frost et al. .................... 711/103 |
| 2001/0042204 | A1 | * | 11/2001 | Blaker et al. .................. 713/165 |
| 2002/0131590 | A1 | * | 9/2002 | Henson et al. .................. 380/44 |
| 2003/0177365 | A1 | * | 9/2003 | Buhan et al. .................. 713/182 |
| 2006/0098815 | A1 | * | 5/2006 | O'Neil ............................ 380/28 |
| 2006/0104301 | A1 | * | 5/2006 | Beyer et al. ................... 370/445 |
| 2006/0129811 | A1 | * | 6/2006 | Fiske ............................ 713/167 |

* cited by examiner

*Primary Examiner* — Nadia Khoshnoodi

(57) ABSTRACT

A system obtains a key and first and second plaintext, where the first plaintext is identical to the second plaintext. The system uses the key to encrypt the first plaintext to a first ciphertext and the second plaintext to a second ciphertext using a same encryption algorithm, where the first ciphertext is different than the second ciphertext.

19 Claims, 16 Drawing Sheets

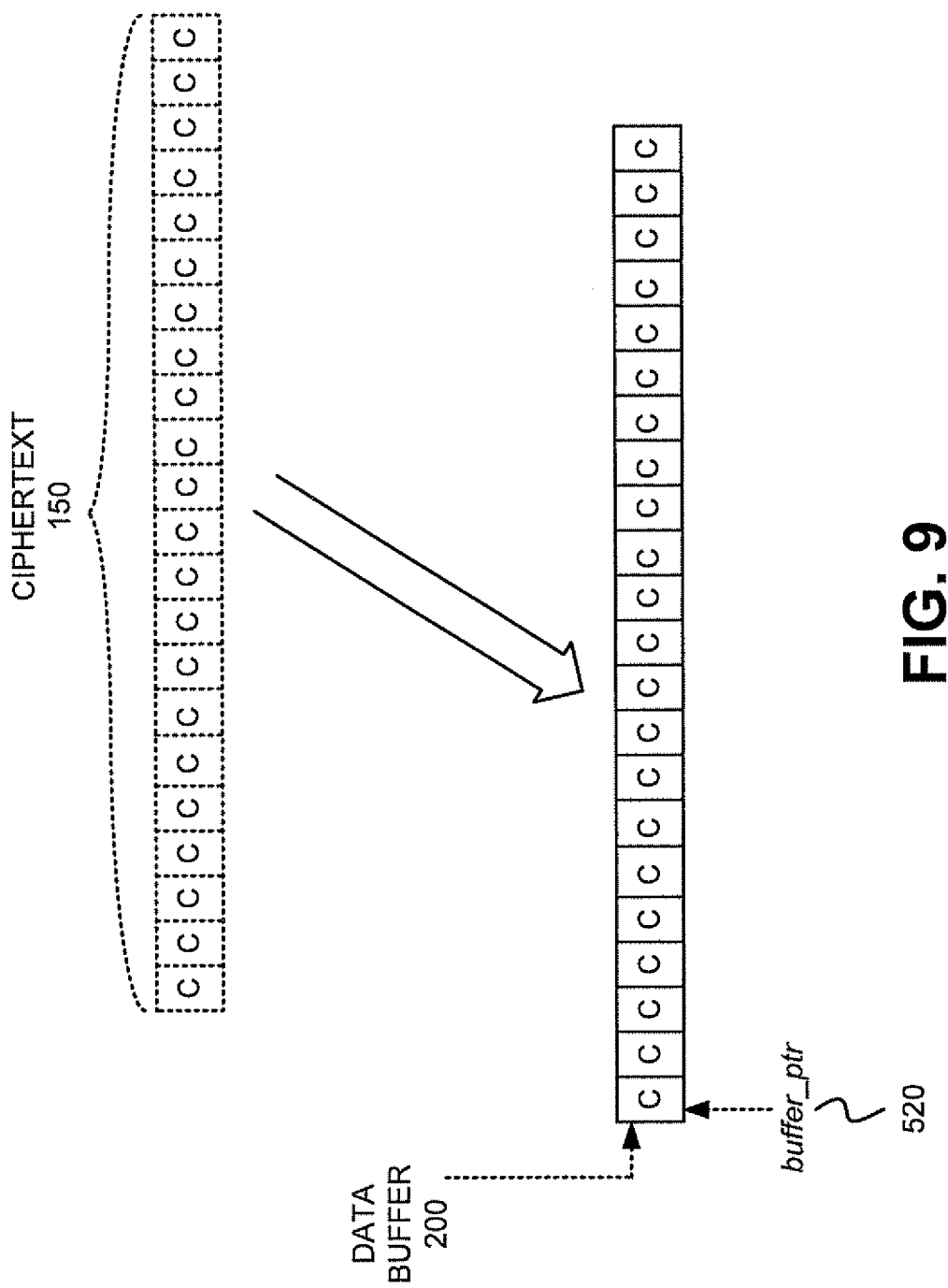

US 9,059,838 B2

ENCRYPTION ALGORITHM WITH RANDOMIZED BUFFER

BACKGROUND

Symmetric, or single-key, encryption, is a widely used technique for encryption by which an intelligible message, referred to as plaintext, is converted into apparently random nonsense referred to as ciphertext. Symmetric encryption uses an encryption algorithm and a key, where the key is typically independent of the plaintext. In symmetric encryption, the encryption algorithm must be such that it is impractical to decrypt the message on the basis of the ciphertext by itself. The security of symmetric encryption, thus, depends on the secrecy of the key, not on the secrecy of the encryption algorithm.

Statistical analysis is a typical technique of cryptanalysis used to break encrypted ciphertext. Diffusion and confusion are two basic cryptographic principles used to thwart such cryptanalysis. Using the principle of diffusion, the statistical structure of the plaintext is dissipated into long-range statistics of the ciphertext. Diffusion is typically achieved by having each plaintext digit affect the value of many ciphertext digits. Using the principle of confusion, the relationship between the statistics of the ciphertext and the value of the encryption key is made to be as complex as possible. Confusion is typically achieved using a complex substitution algorithm.

In existing symmetric encryption, encryption of the same plain text at multiple instances of time using the same encryption algorithm and the same key produces the same ciphertext.

BRIEF DESCRIPTION OF THE DRAWINGS

FIGS. 9-12 are exemplary diagrams graphically illustrating portions of the exemplary process of FIGS. 8A-8C.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

As described herein, a symmetric randomized encryption algorithm is provided that encrypts the same plain text at multiple instances of time using the same encryption algorithm and the same key to produce different ciphertext. The encryption algorithm of exemplary embodiments may, thus, encrypt the same plaintext to different ciphertext each time it is encrypted, even though the decryption algorithm can decrypt the ciphertext precisely. The encryption algorithm of exemplary embodiments generates randomized bytes of data that it appends to the plaintext prior to encryption. Use of the randomized bytes of data in the encryption algorithm ensures that the resulting ciphertext is different at each encryption of the same plaintext. The encryption algorithm of exemplary embodiments further performs an iterative process that obtains sub-portions of the plaintext (and the appended randomized bytes of data) and encrypts each sub-portion using an altered version of the encryption key. Use of the randomized data, and alteration of the encryption key during the iterative encryption process, furthers the principles of diffusion and confusion, thus, inhibiting cryptanalysis of ciphertext produced using the encryption algorithm of exemplary embodiments.

Figure 1:
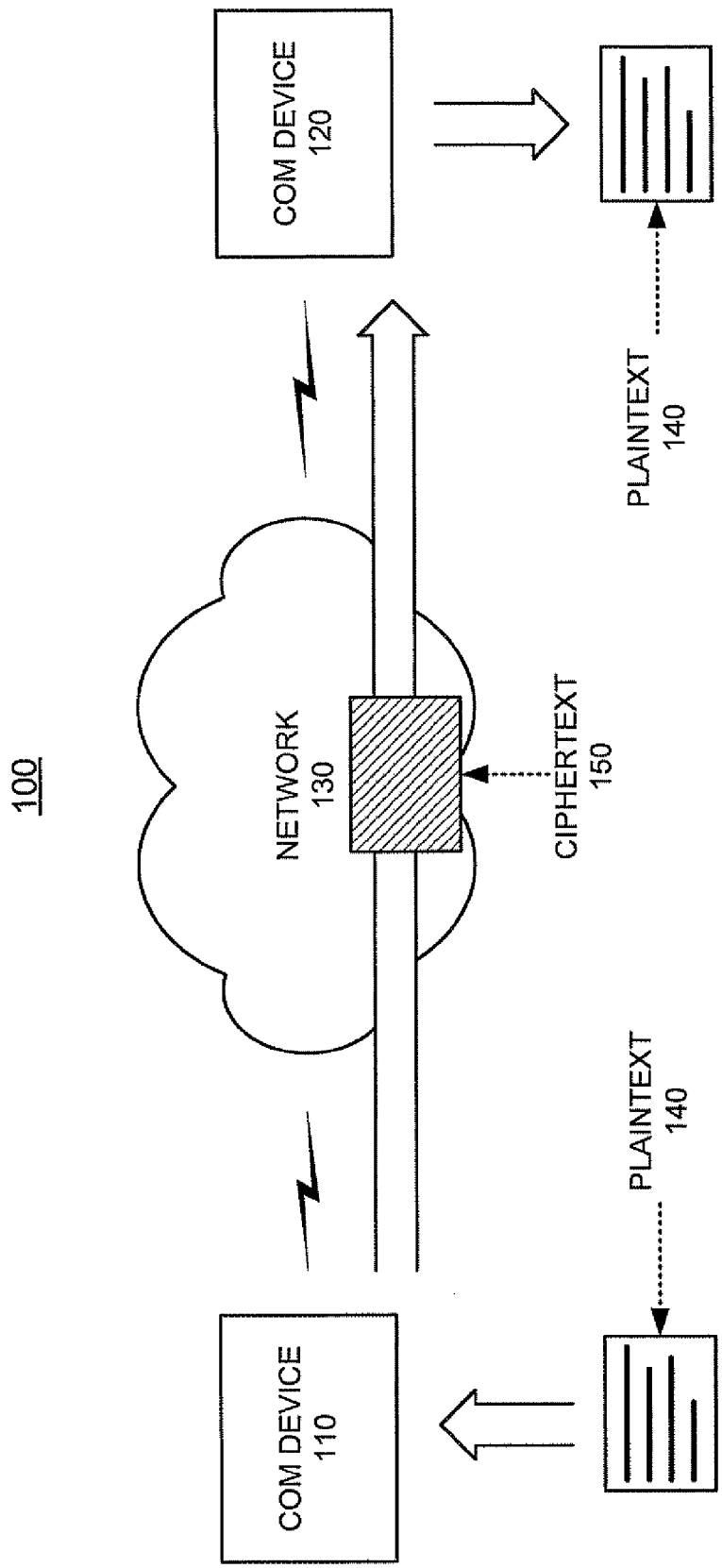
FIG. 1 is a diagram of a communication network according to an exemplary embodiment.

FIG. 1 is a diagram of a communications network 100 according to an exemplary implementation. Network 100 may include a first communication device 110 connected to a second communication device 120 via a network 130. Communication devices 110 and 120 may include any type of devices that may send or receive data. Communication devices 110 and 120 may include a personal computer, a wireless telephone, a Personal Communications System (PCS) terminal, a personal digital assistant (PDA), a lap top or notebook computer, a palmtop computer, or another type of appliance that includes a communication receiver, transmitter or transceiver.

Network 130 may include one or more sub-networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, or a combination of networks. The PLMN(s) may further include a packet-switched sub-network, such as, for example, General Packet Radio Service (GPRS), Cellular Digital Packet Data (CDPD), or Mobile IP sub-network. Communication devices 110 and 120 may connect to network 130 via wired or wireless connections.

Communication device 110 may encrypt plaintext 140, using techniques further described herein, to produce ciphertext 150 that may be transmitted to communication device 120 via network 130. Upon receipt of ciphertext 150, communication device 120 may decrypt ciphertext 150, using techniques further described herein, to re-produce the original plaintext 140.

Communication devices 110 and 120 may encrypt plaintext and decrypt ciphertext using a secret key. The secret key may include a symmetric key that may be shared between communication devices 110 and 120 and may be protected from access by others. The secret key may, therefore, be distributed to communication device 110 and/or 120. This key distribution process may be implemented in a number of ways, including the following: 1) the secret key can be selected at communication device 110 and then physically delivered to communication device 120 (or vice versa) 2) a third party can select a key and physically deliver the key to communication devices 110 and 120; 3) if communication devices 110 and 120 have an encrypted link to a third party, the third party can deliver a key on the encrypted link to communication devices 110 and 120; 4) if communication devices 110 and 120 have previously used an old secret key, communication device 110 can transmit a new key to communication device 120 (or vice versa) by encrypting the new key with the old; and/or 5) communication devices 110 and 120 may agree on a shared key via a one-way mathematical algorithm, such as the Diffie-Helman key agreement algorithm.

Though FIG. 1 depicts plaintext 140 being encrypted to ciphertext 150 and then transmitted from communication device 110 to communication device 120 via network 130, ciphertext 150 may also be physically delivered from device 110 to device 120 according to other exemplary embodiments. For example, ciphertext 150 may be stored on a computer-readable medium (e.g., compact disc) and then physically delivered to device 120 for decryption. In further exemplary embodiments, plaintext 140 may be encrypted, stored, and decrypted at a single device (e.g., communication device 110 or 120), without the transmission or physical delivery of ciphertext 150 to another device.

Figure 2:
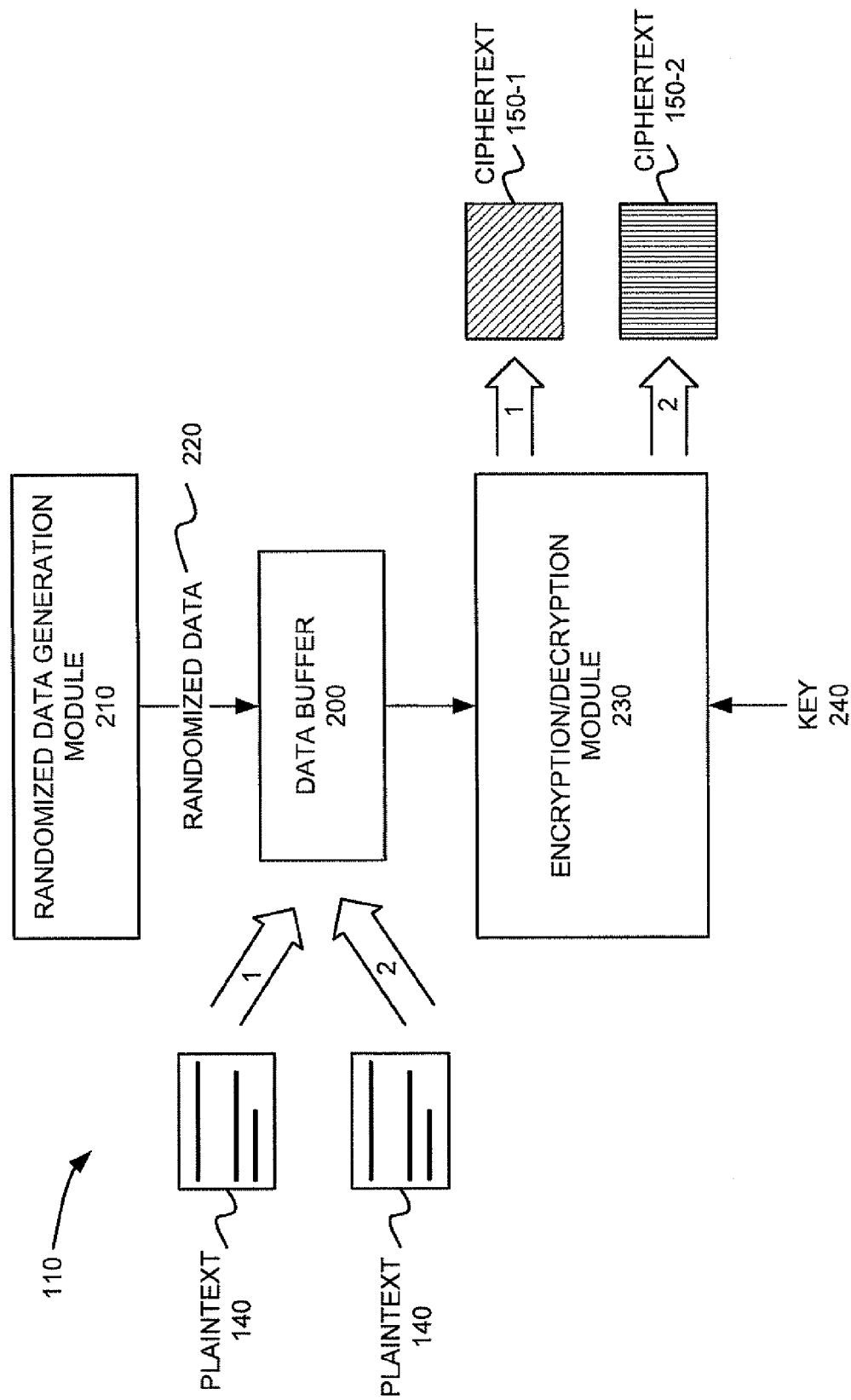
FIG. 2 is a diagram of exemplary components of a device involved in encrypting plaintext to produce ciphertext.

FIG. 2 illustrates exemplary components of communication device 110 that are involved in encrypting plaintext. Communication device 110 may include a data buffer 200, a randomized data generation module 210 and an encryption/decryption module 230. Communication device 110 may obtain a first instance of plaintext 140 and store it in data buffer 200. Randomized data generation module 210 may then generate randomized data 220 and may append randomized data 220 to plaintext 140 in data buffer 200. The randomized data may be generated using any technique for generating random bytes of data. In one implementation, a system clock associated with communication device 110 may be used to generate randomized data 220. The data content of randomized data 220 may, thus, be different based on a different system clock time at each instance of generation of random data 220

Encryption/decryption module 230 may encrypt plaintext 140, using key 240 and the encryption algorithm described below with respect to FIGS. 4A-4C, to produce a first instance of ciphertext 150-1. Communication device 110 may send ciphertext 150-1 to communication device 120 via network 130. As further shown in FIG. 2, communication device 110 may subsequently obtain the same plaintext 140 and may store it in data buffer 200. Randomized data generation module 210 may then generate different randomized data 220, than was previously generated, and may append the different randomized data 220 to plaintext 140 in data buffer 200. Encryption/decryption module 230 may encrypt plaintext 140, using key 240 and the same encryption algorithm used above, to produce ciphertext 150-2, where ciphertext 150-2 is different than ciphertext 150-1. Communication device 110 may send ciphertext 150-2 to communication device 120 via network 130. The encryption algorithm of exemplary embodiments, thus, may encrypt a same item of plaintext to different ciphertext using the same encryption algorithm and the same encryption key. Randomized data generation module 210 and encryption/decryption module 230 may be implemented in hardware, software, or any combination of hardware and software.

Figure 3:
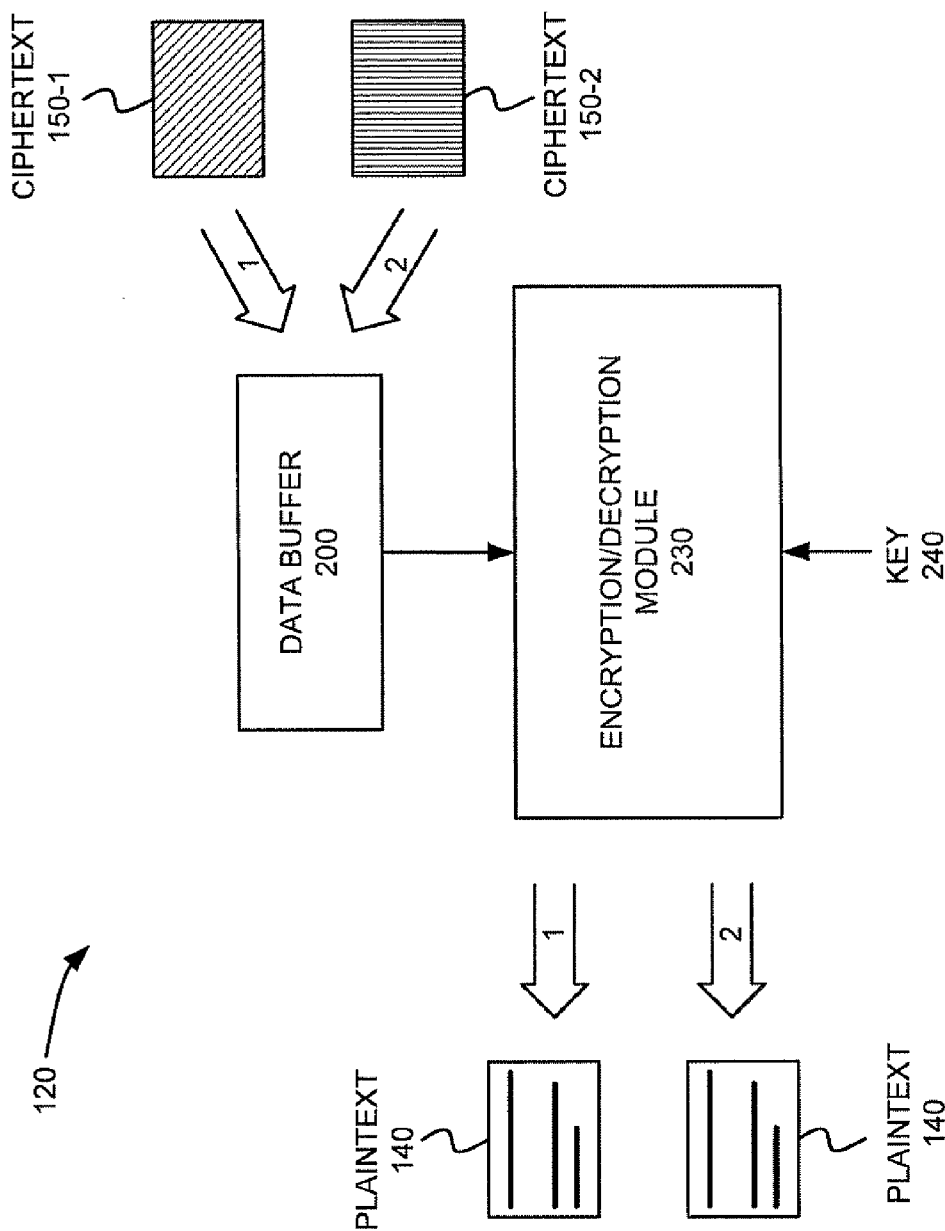
FIG. 3 is a diagram of exemplary components of a device involved in decrypting ciphertext to reproduce plaintext.

FIG. 3 illustrates exemplary components of communication device 120 that are involved in decrypting ciphertext. Communication device 120 may include similar components to those of communication device 110. For example, communication device 120 may include data buffer 200 and encryption/decryption module 230. Communication device 120 may receive ciphertext 150-1 from communication device 110 and may store ciphertext 150-1 in data buffer 200. Encryption/decryption module 230 may decrypt ciphertext 150-1, using key 240 and the decryption algorithm described below with respect to FIGS. 8A-8C, to reproduce plaintext 140. Communication device 120 may subsequently receive ciphertext 150-2 from communication device 110 and may store ciphertext 150-2 in data buffer 200. Encryption/decryption module 230 may decrypt ciphertext 150-2, using key 240 and the same encryption algorithm used above, to reproduce plaintext 140.

Figure 4A:
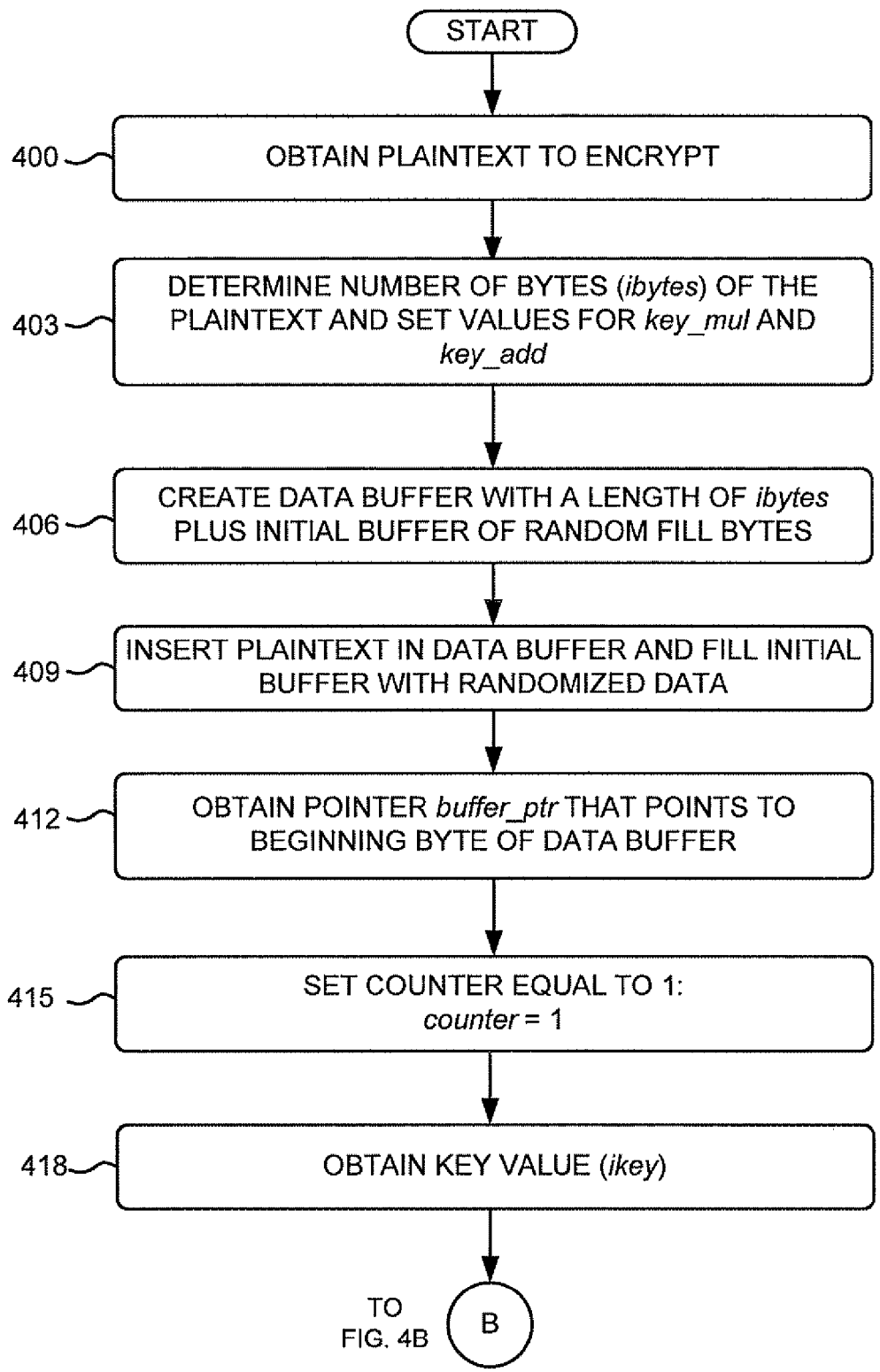
FIGS. 4A-4C are flowcharts of a process for encrypting plaintext according to an exemplary embodiment.
Figure 4B:
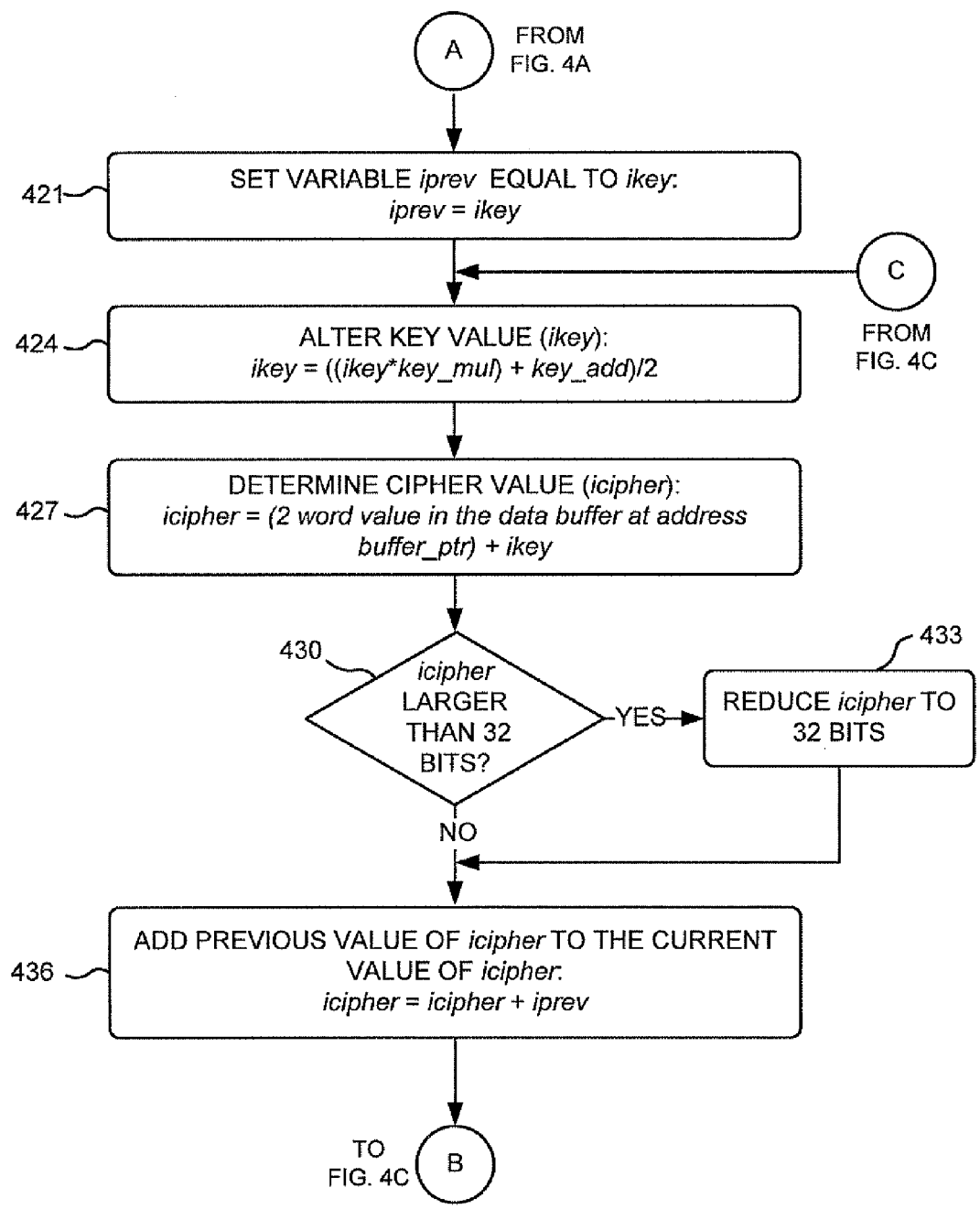
Figure 4C:
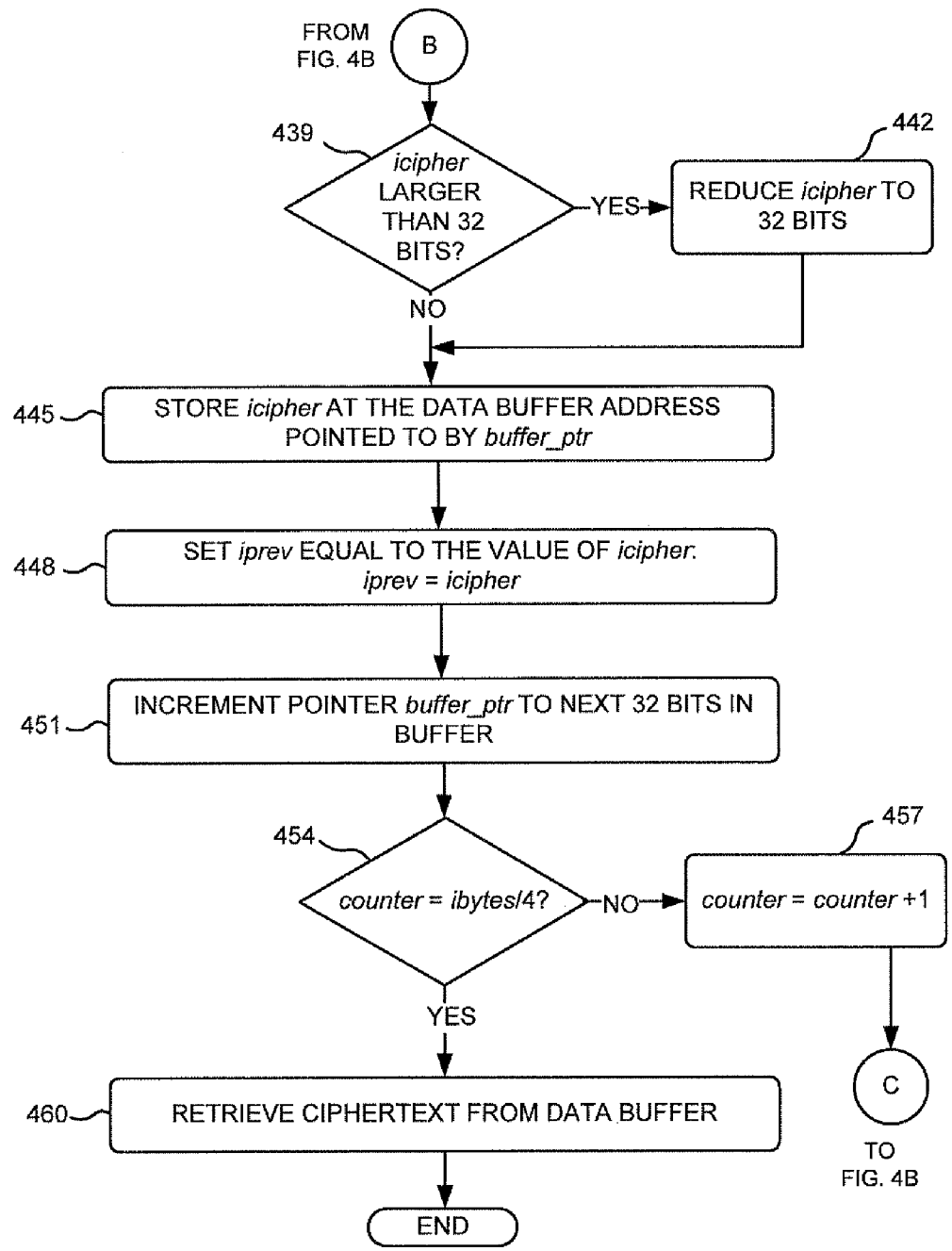

FIGS. 4A, 4B and 4C are flowcharts of a process for encrypting plaintext at communication device 110 according to an exemplary embodiment. The exemplary process of FIGS. 4A-4C may also be used for encrypting plaintext at communication device 120.

Figure 5:
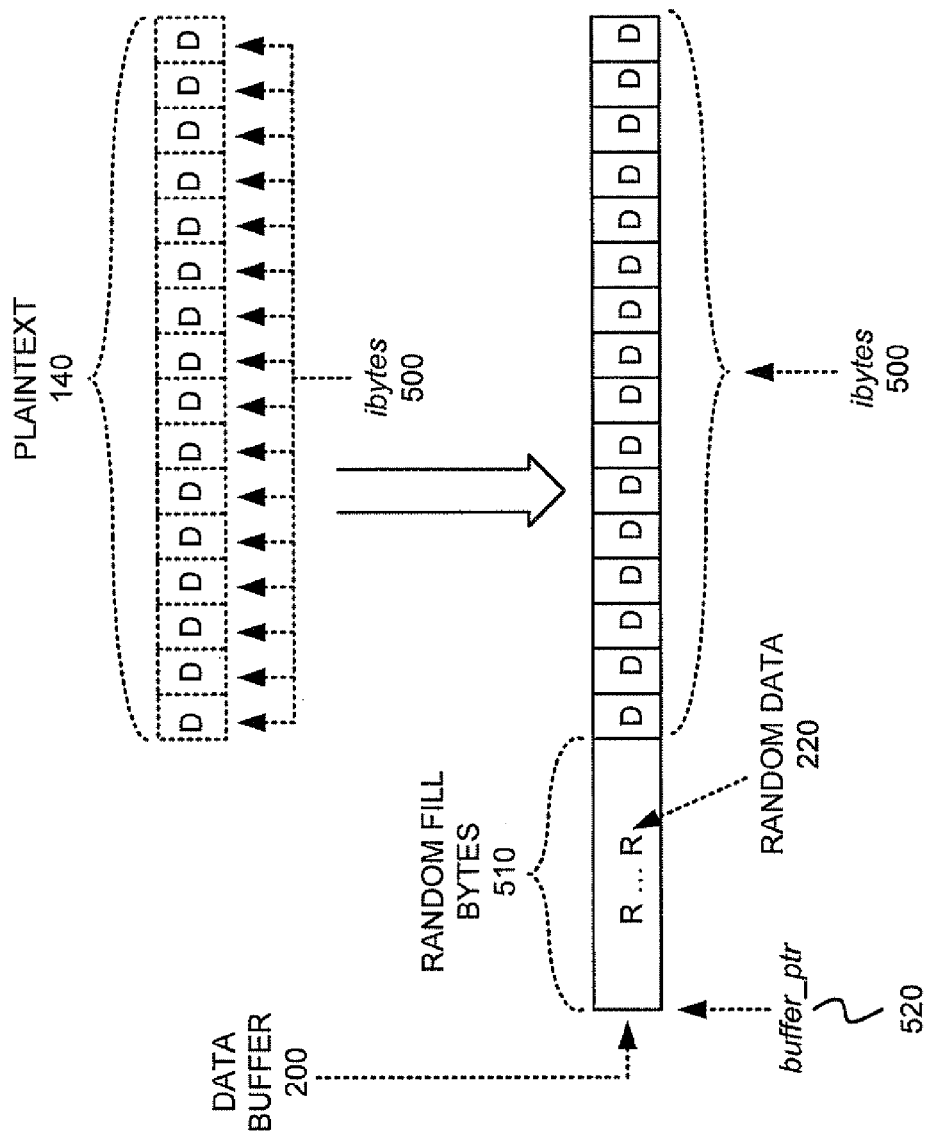
FIGS. 5-7 are exemplary diagrams graphically illustrating portions of the exemplary process of FIGS. 4A-4C.

The exemplary plaintext encryption process may begin with communication device 110 obtaining plaintext 140 to encrypt (block 400). For example, a user of communication device 110 may supply the plaintext to be encrypted. As shown in FIG. 5, plaintext 140, having a length of ibytes 500 may be obtained. A number of bytes (ibytes) of the plaintext may be determined and values for key_mul and key_add may be set (block 403). key_mul and key_add are values subsequently used for altering key 240 during iterations of the plaintext encryption algorithm. key_mul and key_add may be preset constants or may vary according to defined parameters, or based on a function. In one implementation, key_mul may be set equal to hexadecimal 00122C77 and key_add may be set equal to hexadecimal FBC4DAE7.

Data buffer 200 may be created having a length of ibytes plus an initial buffer of random fill bytes may be created (block 406). Data buffer 200 may be created in a memory unit (not shown) associated with communication device 110. FIG. 5 graphically illustrates the formation of data buffer 200 to have a length of ibytes 500 plus random fill bytes 510. The plaintext 140 may be inserted into data buffer 200 and the initial buffer may be filled with randomized data 220 (block 409). The randomized data may be generated by randomized data generation module 210 using any technique for generating multiple bytes of random data. For example, in one implementation, a system clock associated with communication device 110 may be used to generate random data 220. Thus, based on a different system clock time at each instance of generation of random data 220, the data content of random data 220 will be different. Randomized data generation module 210 may, for example, generate random data 220 as a function of a current time of the system clock. FIG. 5 graphically depicts the insertion of plaintext 140 into data buffer 200 and random data 220 into random fill bytes 510 of data buffer 200. A pointer (buffer_ptr) that points to the beginning bytes of data buffer 200 may then be obtained (block 412). FIG. 5 graphically depicts buffer pointer buffer_ptr 520 pointing to the beginning bytes of data buffer 200.

A counter value (counter) may be set equal to one (block 415). The counter value may specify the number of segments of plaintext 140 that are iteratively processed to obtain cipher values that are used to produce ciphertext 150. A key value (ikey) may be obtained (block 418). The key value value (ikey) may include key 240 that has previously been distributed by and/or to communication devices 110 and 120. A variable iprev may be set equal to ikey (block 421—FIG. 4B). iprev may include a temporary storage location for storing previous values of ikey and/or a cipher value icipher (further described below).

The key value (ikey) may be altered using values key_mul and key_add (block 424). For example, key value ikey may be altered using the following equation:

$$i\text{key} = ((i\text{key}*\text{key\_mul}) + \text{key\_add})/2 \qquad \text{Equation (1)}$$

Figure 6:
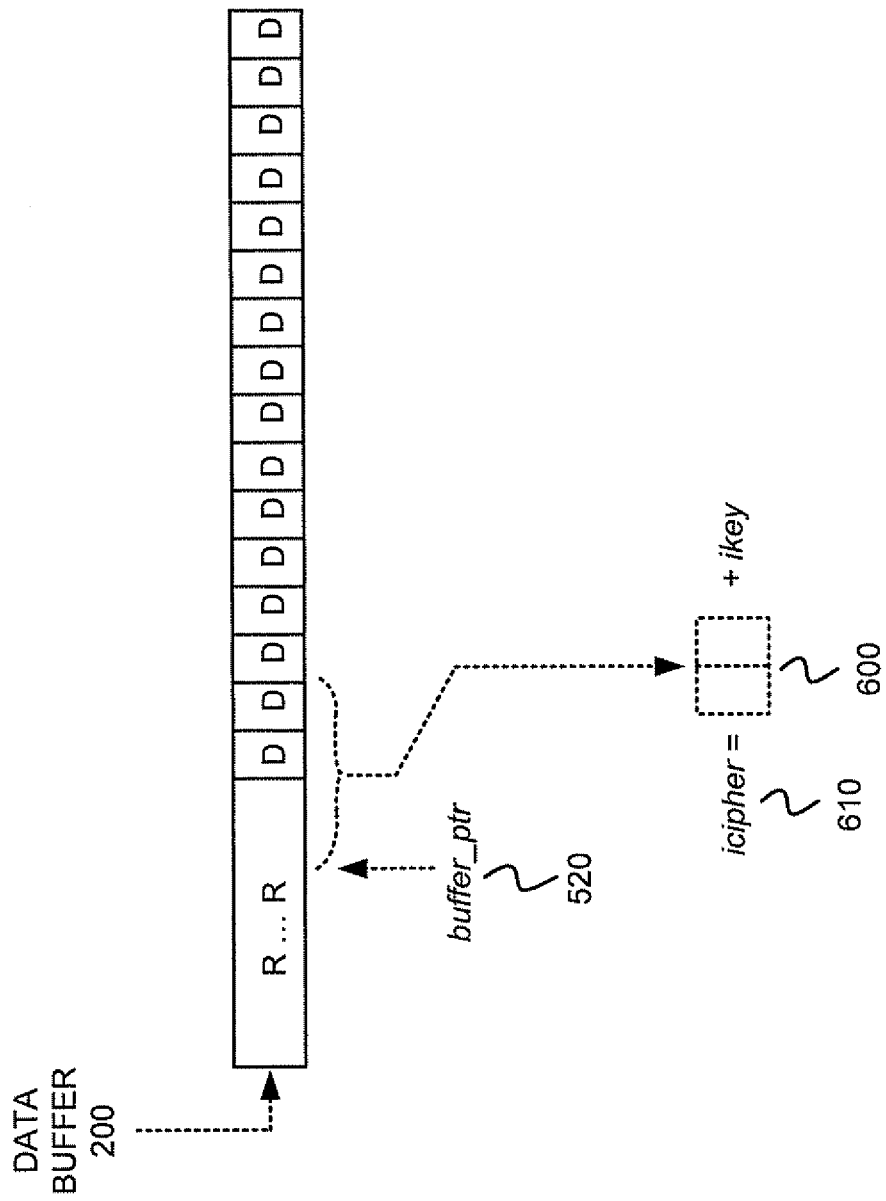

A cipher value (icipher) may be determined by adding ikey to the 2 word value stored in data buffer 200 at address buffer_ptr (block 427), where a word may be equal to two bytes. Thus, 2 words may equal four bytes. FIG. 6 graphically depicts the 2 word value 600, stored in data buffer 200 at the address corresponding to buffer_ptr 520, being added to ikey to produce the cipher value icipher 610.

A determination may be made whether the cipher value icipher is larger than 32 bits (block 430). If so (block 430-YES), the icipher may be reduced to 32 bits, thus, eliminating any higher order bits beyond the first 32 bits (block 433). If icipher is not larger than 32 bits (block 430-NO), a previous value of icipher (iprev) may be added to the current value of icipher (block 436):

$$i\text{cipher}=i\text{cipher}+i\text{prev} \qquad \text{Equation (2)}$$

Figure 7:
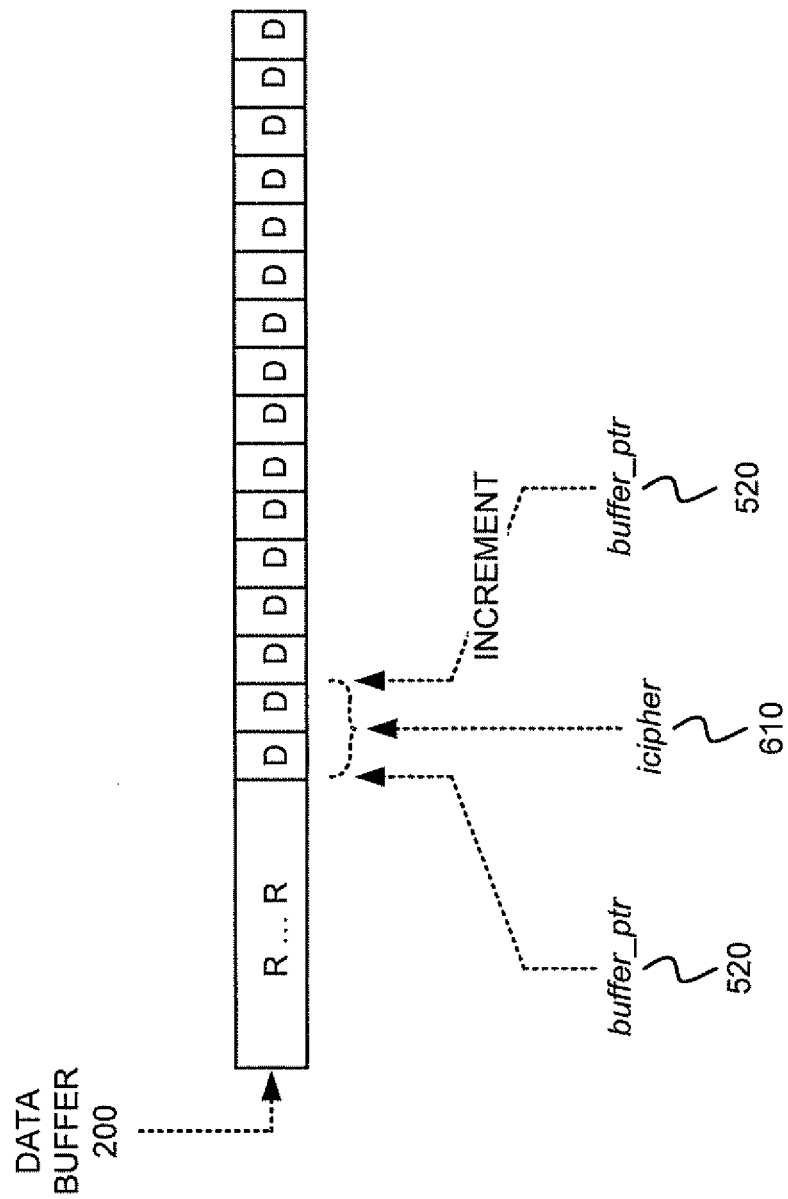

A determination may again be made whether the cipher value icipher is larger than 32 bits (block 439—FIG. 4C). If so (block 439-YES), then icipher may be reduced to 32 bits (block 442). If icipher is not larger than 32 bits (block 439-NO), then icipher may be stored in data buffer 200 at the address pointed to by buffer_ptr (block 445). FIG. 7 graphically depicts the storing of icipher 610 in data buffer 200 at the address corresponding to buffer_ptr 520. Variable iprev may then be set equal to the current value of icipher (block 448):

$$i\text{prev}=i\text{cipher} \qquad \text{Equation (3)}$$

Data buffer 200 pointer buffer_ptr 520 may be incremented to the next 32 bits stored in data buffer 200 (block 451). FIG. 7 further graphically illustrates the incrementing of buffer_ptr 520 to point to the next 2 bytes of data in data buffer 200. A determination may be made whether the counter value (counter) equals the number of bytes in the plaintext (ibytes) divided by 4 (block 454). If not (block 454-NO), then the counter value may be incremented (block 457) and the exemplary process may return to block 424:

$$\text{counter}=\text{counter}+1 \qquad \text{Equation (4)}$$

If the counter value equals ibytes (block 454-YES, then the encryption process may be complete and the resulting ciphertext may be retrieved from data buffer 200 (block 460). Communication device 110 may then transmit the retrieved ciphertext to communication device 120 via network 130.

Figure 8A:
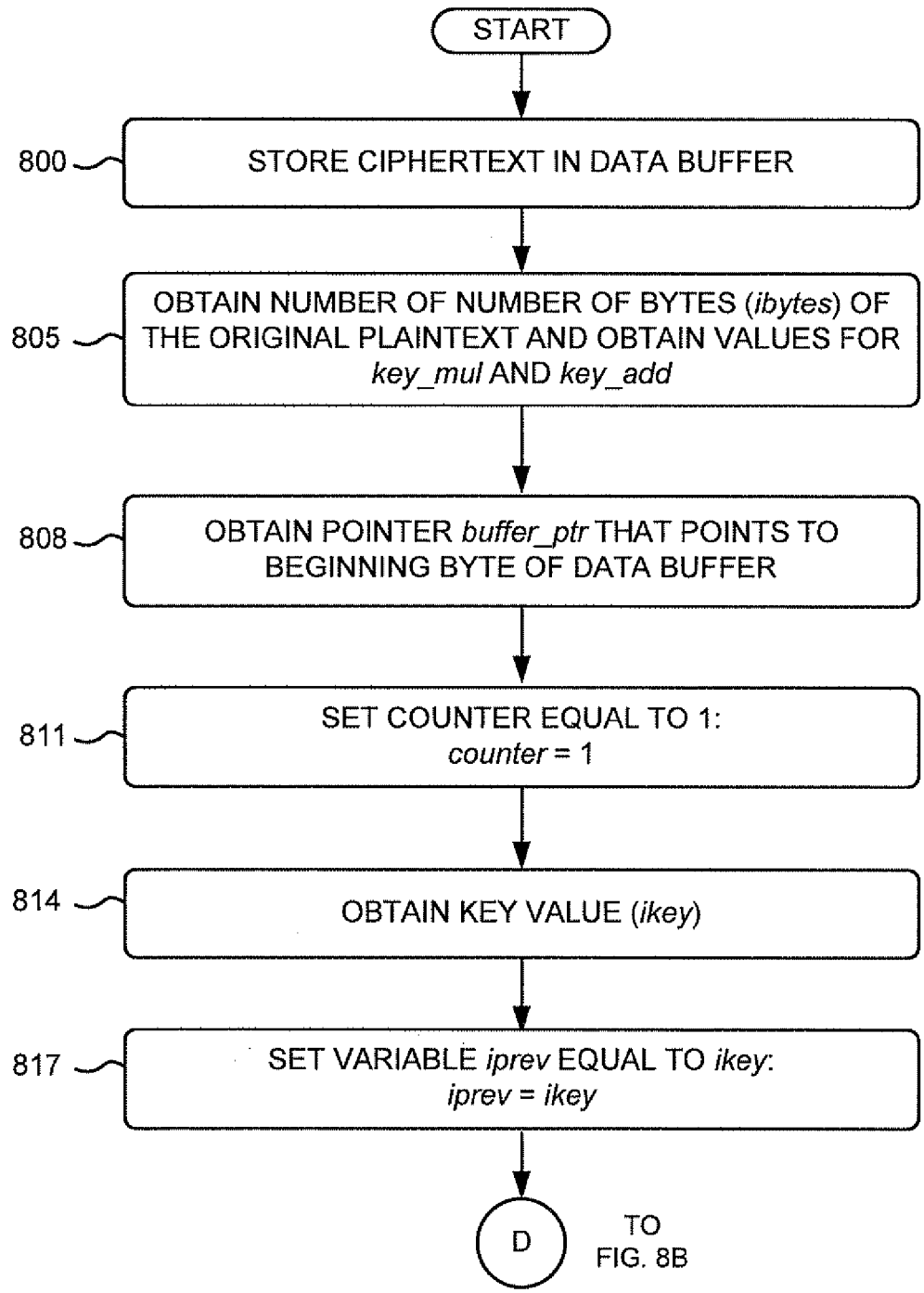
FIGS. 8A-8C are flowcharts of a process of decrypting ciphertext according to an exemplary embodiment.
Figure 8B:
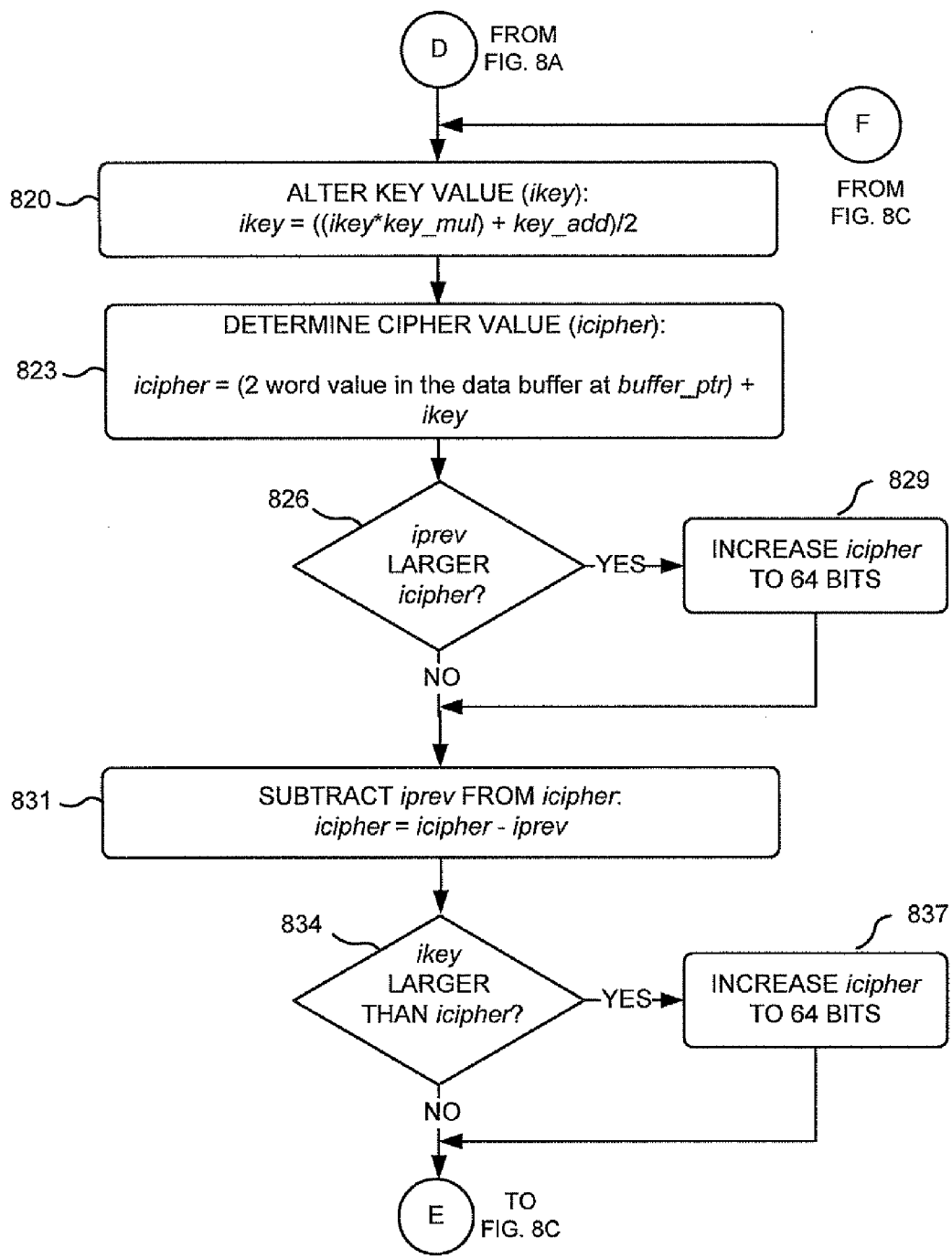
Figure 8C:
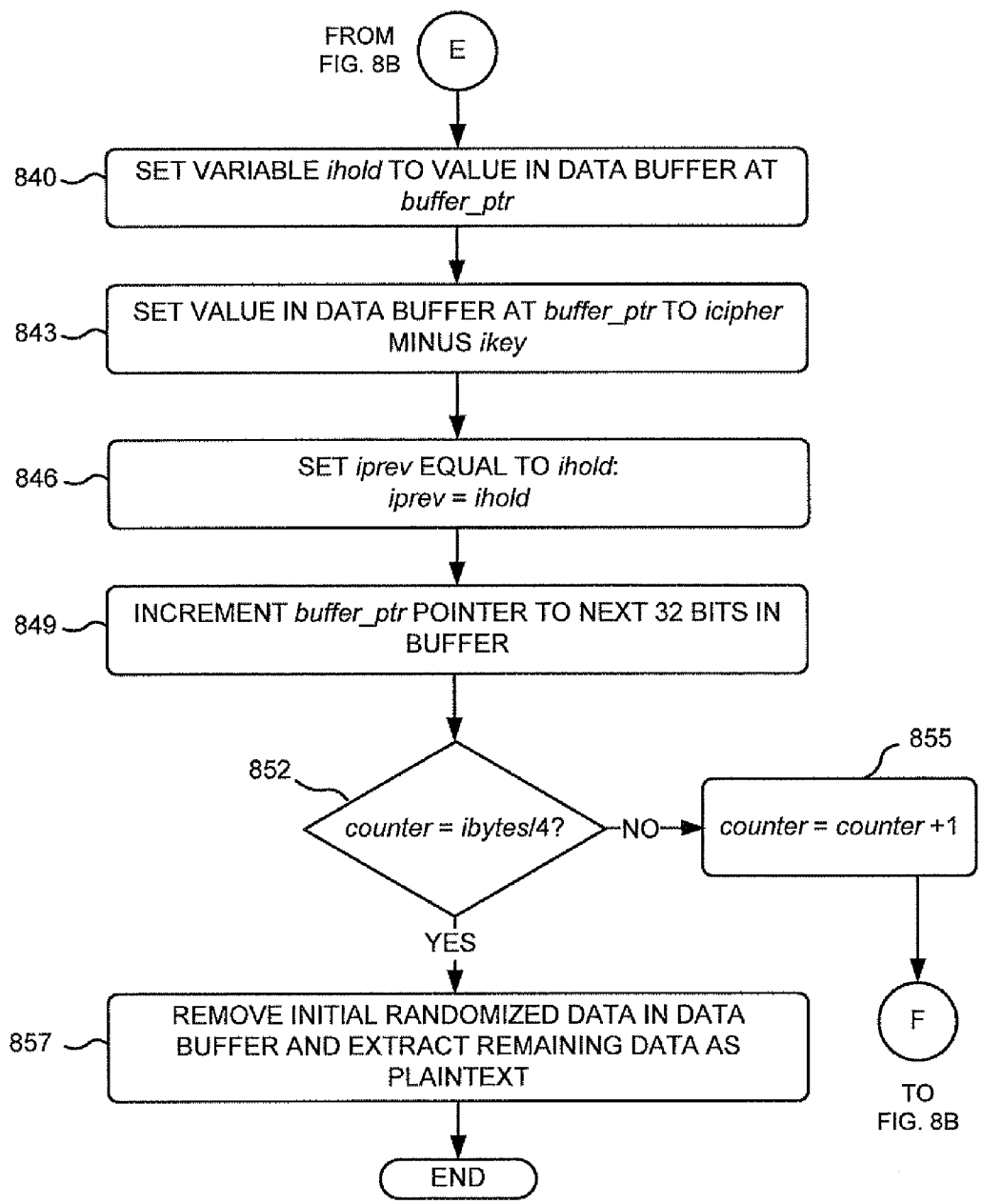

FIGS. 8A, 8B and 8C are flowcharts of an exemplary process for decrypting ciphertext at communication device 120 according to an exemplary embodiment. The exemplary process of FIGS. 8A-8C may also be used for decrypting ciphertext received at communication device 110.

The exemplary process may begin with storing ciphertext in data buffer 200 (block 800). Communication device 120 may, for example, receive the ciphertext from communication device 110 via network 130. FIG. 9 graphically illustrates ciphertext 150 being stored in data buffer 200. A number of bytes (ibytes) of the original plaintext, and values for key_mul and key_add, may be obtained (block 805). key_mul and key_add may include the identical values used in the exemplary encryption process of FIGS. 4A-4C above. key_mul and key_add may be preset constants or may vary according to defined parameters or based on a function. ibytes, key_mul and key_add are values known to both communication device 110 and 120. The pointer (buffer_ptr) that points to the beginning byte of data buffer 200 may be obtained (block 808). FIG. 9 graphically illustrates buffer_ptr 520 pointing to the beginning byte of data buffer 200.

The counter value (counter) may be set equal to one (block 811). The counter value may specify a number of times ciphertext 150 is iteratively processed to reproduce the original plaintext 140. A key value (ikey) may be obtained (block 814). The key value value (ikey) may include key 240 that has previously been distributed by and/or to communication devices 110 and 120 and was used by communication device 110 to encrypt plaintext 140. Variable iprev may be set equal to ikey (block 817):

$$i\text{prev}=i\text{key} \qquad \text{Equation (5)}$$

iprev may include a temporary storage location for storing previous values of ikey and/or cipher value icipher (as further described below).

The key value (ikey) may be altered using values key_mul and key_add (block 820—FIG. 8B). For example, ikey may be altered using the following:

$$i\text{key}=((i\text{key}*\text{key\_mul})+\text{key\_add})/2 \qquad \text{Equation (6)}$$

Figure 10:
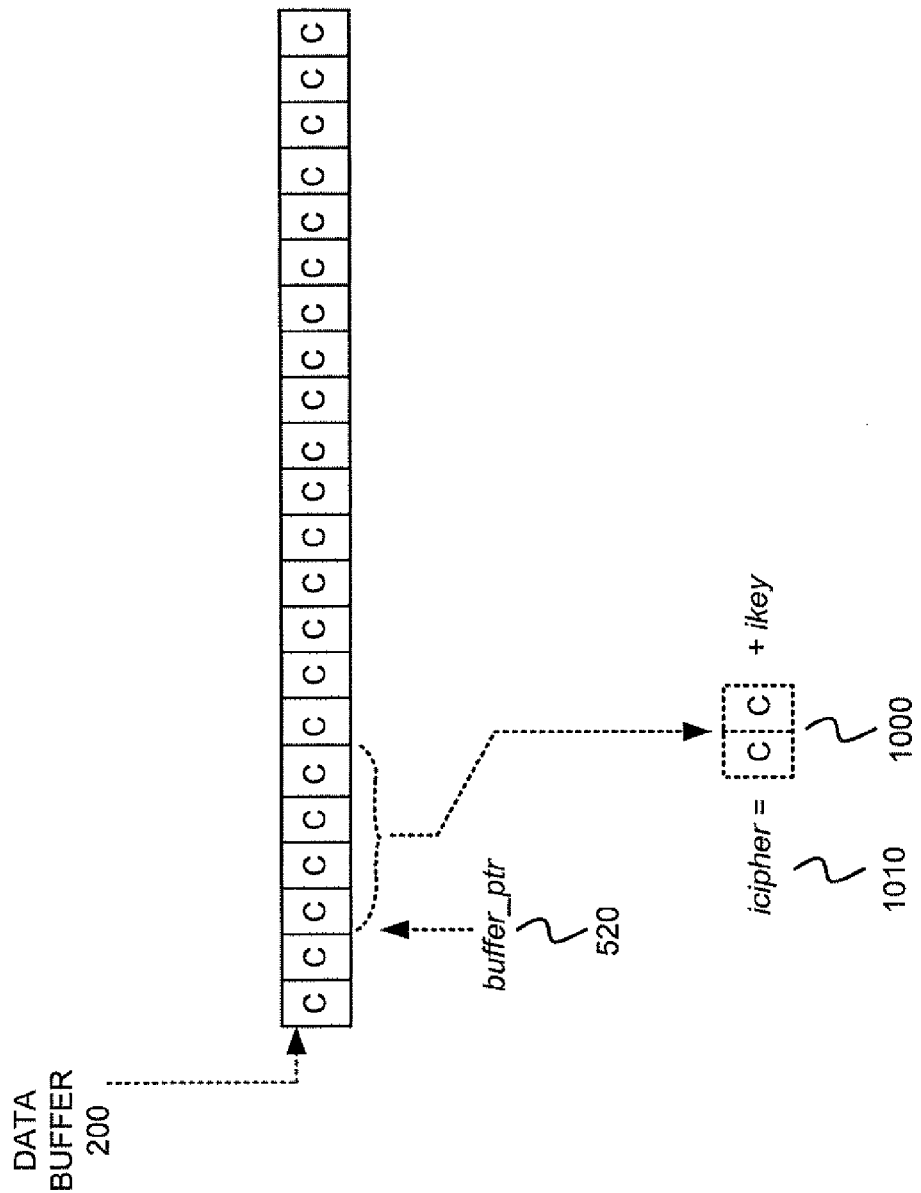

A cipher value (icipher) may be determined by adding the value of ikey to the 2 word value stored in data buffer 200 at the address pointed to by buffer_ptr 520 (block 823), where a word may equal two bytes. Thus, two words may equal four bytes. FIG. 10 graphically depicts the 2 word value 1000 stored in data buffer 200 at the address corresponding to buffer_ptr 520 being added to ikey to produce the cipher value icipher 1010.

A determination may be made whether iprev is larger than icipher (block 826). If so (block 826-YES), then icipher may be increased to 64 bits (block 829). If iprev is not larger than icipher (block 826-NO), then iprev may be subtracted from icipher (block 831):

$$i\text{cipher}=i\text{cipher}-i\text{prev} \qquad \text{Equation (7)}$$

Figure 11:
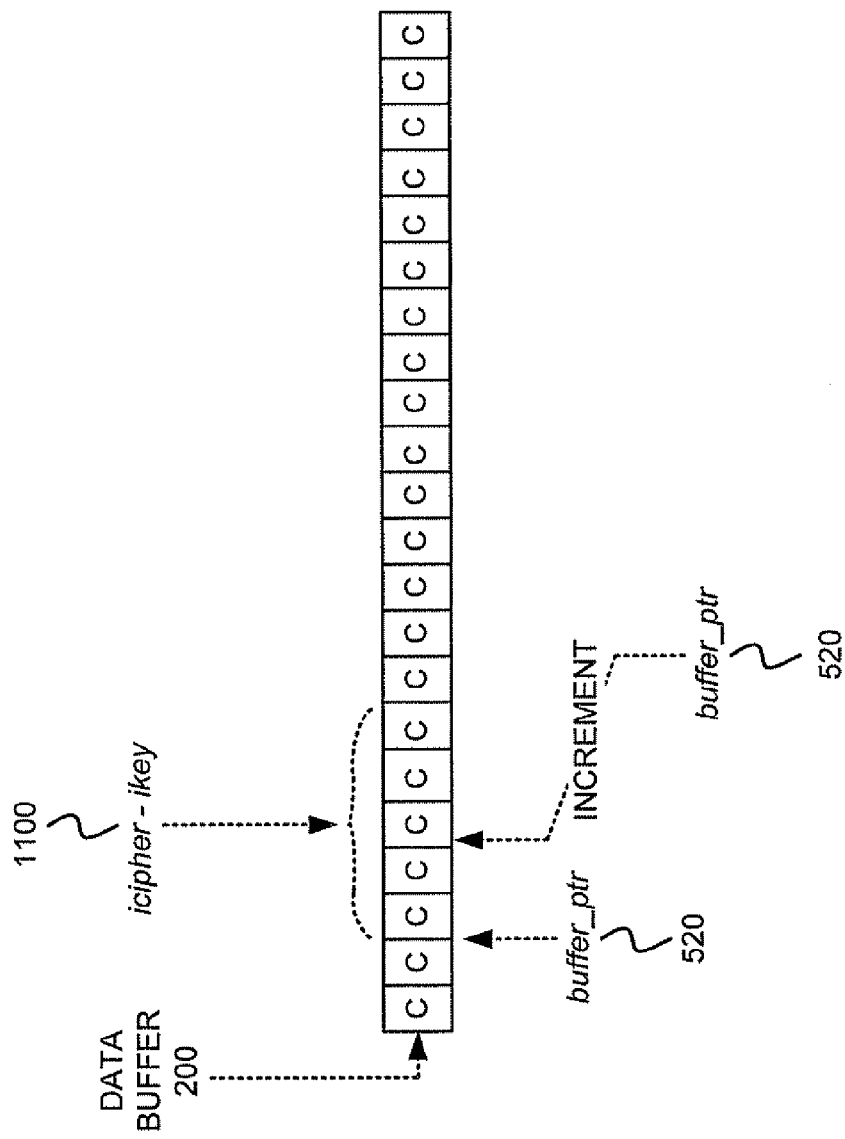

A determination may be made whether ikey is larger than icipher (block 834). If so (block 834-YES), then icipher may be increased to 64 bits (block 837). If not (block 834-NO), then a variable ihold may be set to the value stored at the address in data buffer 200 that corresponds to buffer_ptr (block 840—FIG. 8C). Variable ihold temporarily stores the 2 byte ciphertext value currently stored at the address corresponding to buffer_ptr 520. The value in data buffer 200 at the address corresponding to buffer_ptr may be set to icipher minus ikey (block 843). FIG. 11 graphically depicts the value icipher—ikey 1100 being stored in data buffer 200 at buffer_ptr 520.

The value iprev may be set equal to the value of ihold (block 846):

$$i\text{prev}=i\text{hold} \qquad \text{Equation (8)}$$

Buffer pointer (buffer_ptr) 520 may then be incremented to the next 32 bits in data buffer 200 (block 849) for the next iteration of the decryption process. FIG. 11 graphically depicts buffer_ptr 520 being incremented to the next 32 bits in data buffer 200.

A determination may be made whether the counter value (counter) is equal to ibytes divided by 4 (block 852). If not (block 852-NO), then the counter value may be incremented and the exemplary process may return to block 820 to execute the next iteration of the decryption process:

$$\text{counter}=\text{counter}+1 \qquad \text{Equation (9)}$$

Figure 12:
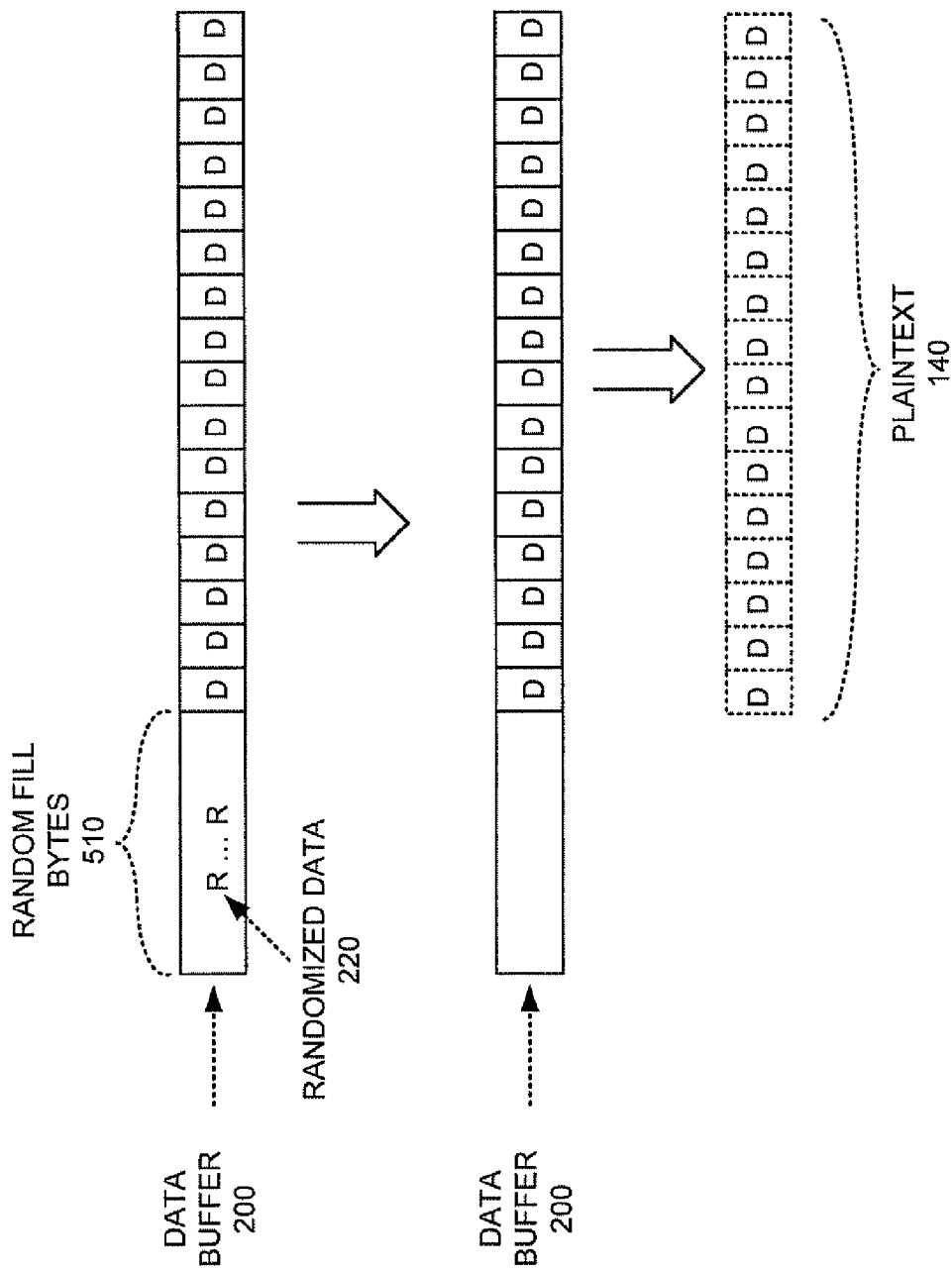

If the counter value is equal to ibytes divided by 4 (block 852-YES), then the decrypted initial randomized data 220 (appended to plaintext 140 in the block 409 of the exemplary encryption process above) may be removed from data buffer 200 and the remaining data in data buffer 200 may be extracted as plaintext 140 (block 857). FIG. 12 graphically depicts randomized data 220 being removed from the random fill bytes 510 portion of data buffer 200, leaving only the reproduced plaintext 140.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Modifications and variations are possible in light of the specification, or may be acquired from practice of the invention.

For example, while a series of blocks has been described with regard to FIGS. 4A-4C and 8A-8C, the order of the blocks may be modified in other implementations consistent with the principles of the invention. Further, non-dependent blocks may be performed in parallel. The exemplary processes of FIGS. 4A-4C and 8A-8C have been described as performing various operations upon data (e.g., plaintext size, key size, size of icipher, etc.) of certain sizes (i.e., number of bits, bytes or words). However, it will be appreciated that the different blocks of the exemplary processes of FIGS. 4A-4C and 8A-8C may apply to data of different sizes than those explicitly described.

The exemplary encryption process of FIGS. 4A-4C has been described as using a single key value (ikey). However, in other exemplary embodiments, multiple keys, or a single key split into multiple sub-keys, may be used to encrypt the plaintext. For example, in such embodiments, a first key (ikey) (or a first portion of the first key) may be used to encrypt the randomized data and plaintext to produce first ciphertext at block 460 (FIG. 4C) that may be placed back into data buffer 200. Then a second key (or a second portion of the first key) may be used, in conjunction with blocks 412-460 of the exemplary encryption process of FIGS. 4A-4C (or blocks 406-460 if randomized data is used in the second encryption), to double encrypt the previous ciphertext to produce second ciphertext. This may be further extended to encrypt the plaintext three or more times (i.e., the ciphertext produced at block 460 may be re-encrypted multiple times by performing blocks 412-460 multiple times). Re-encrypting the ciphertext in this manner increases the strength of the encryption.

It will be apparent that embodiments, as described above, may be implemented in many different forms of software, firmware, and hardware in the implementations illustrated in the figures. The actual software code or specialized control hardware used to implement embodiments is not limiting of the invention. Thus, the operation and behavior of the embodiments have been described without reference to the specific software code, it being understood that software and control hardware may be designed based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   obtaining, by a device, a first item of plaintext, a second item of plaintext, and an encryption key,
      the second item of plaintext being identical to the first item of plaintext;
   appending, by the device, first randomized data to an end of the first item of plaintext and second randomized data to an end of the second item of plaintext;
   encrypting, by the device, the first item of plaintext, including the appended first randomized data, using an encryption algorithm and the encryption key to produce first ciphertext,
      the encrypting the first item of plaintext including iteratively encrypting a plurality of data segments of the first item of plaintext,
         an iteration of encrypting a data segment of the plurality of data segments including: determining a first value based on the encryption key and the data segment of the first item of plaintext, determining whether the first value comprises more than a threshold quantity of bits,
         reducing the first value to comprise the threshold quantity of bits when the first value comprises more than the threshold quantity of bits to form a second value,
         adding a predetermined value, to the first value, to obtain a third value when the first value does not comprise more than the threshold quantity of bits,
         determining whether the third value comprises more than the threshold quantity of bits, and
         reducing the third value to comprise the threshold quantity of bits to obtain a fourth value when the third value comprises more than the threshold quantity of bits,
         the first ciphertext including a cypher value for the data segment, the cypher value comprising:
            the second value when the first value comprises more than the threshold quantity of bits,
            the third value when the third value does not comprise more than the threshold quantity of bits, or
            the fourth value when the third value comprises more than the threshold quantity of bits; and
   encrypting, by the device, the second item of plaintext, including the appended second randomized data, using the encryption algorithm and the encryption key to produce second ciphertext,
      the second ciphertext being different than the first ciphertext.

2. The method of claim 1, further comprising:
   decrypting the first ciphertext and the second ciphertext using a same decryption algorithm to produce the first item of plaintext and the second item of plaintext.

3. The method of claim 1, where encrypting the first item of plaintext further includes:
   segmenting the first item of plaintext into the plurality of data segments based on a number of bits associated with the first item of plaintext, and
   encrypting each data segment, of the plurality of data segments, using the encryption algorithm and the encryption key.

4. The method claim 1, further comprising:
   generating the first randomized data based on a time at which the first randomized data is generated; and
   generating the second randomized data based on a time at which the second randomized data is generated,
      where the time at which the second randomized data is generated is different from the time at which the first randomized data is generated.

5. The method of claim 4, where encrypting the first item of plaintext includes:
   segmenting the first item of plaintext, including the appended first randomized data, into the plurality of data segments;
   altering the encryption key to obtain a different key value for each data segment of the plurality of data segments of the first item of plaintext; and
   determining a different cipher value for each data segment of the plurality of data segments of the first item of plaintext based on the different key value.

6. The method of claim 5, where the first ciphertext is based on the different cipher value determined for each data segment of the plurality of data segments of the first item of plaintext.

7. The method of claim 1, where the plurality of data segments of the first item of plaintext are a plurality of first data segments,
where encrypting the second item of plaintext includes:
segmenting the second item of plaintext into a second plurality of data segments;
altering the encryption key to obtain a different key value for each second data segment, of the plurality of second data segments, of the second item of plaintext; and
determining a different cipher value for each second data segment of the plurality of second data segments, of the second item of plaintext, based on the different key value.

8. The method of claim 7, where the second ciphertext is based on the different cipher value determined for each second data segment of the plurality of second data segments of the second item of plaintext.

9. A system, comprising:
a first data buffer, at least partially implemented in hardware, to store first plaintext and second plaintext,
the first plaintext being identical to the second plaintext; and an encryption module, at least partially implemented in hardware, to:
append first randomized data to an end of the first item of plaintext and second randomized data to an end of the second item of plaintext;
encrypt the first plaintext, including the appended first randomized data, using a particular encryption algorithm and a key to produce a first ciphertext,
the encrypting the first plaintext including iteratively encrypting a plurality of data segments of the first plaintext,
the encryption module, for an iteration of encrypting a data segment of the plurality of data segments, being to:
determine a first value based on the key and the data segment of the plurality of data segments of the first plaintext,
determine whether the first value comprises more than a threshold number of bits,
reduce the first value to comprise the threshold number of bits when the first value comprises more than the threshold number of bits to form a second value,
add a predetermined value, to the first value, to obtain a third value when the first value does not comprise more than the threshold number of bits,
determine whether the third value comprises more than the threshold number of bits, and
reduce the third value to comprise the threshold number of bits to obtain a fourth value, when the third value comprises more than the threshold number of bits, and
the first ciphertext including a cypher value for the data segment, the cypher value comprising:
the second value when the first value comprises more than the threshold number of bits,
the third value when the third value does not comprise more than the threshold number of bits, or
the fourth value when the third value comprises more than the threshold number of bits, and
encrypt the second plaintext, including the appended second randomized data, using the particular algorithm and the key to produce a second ciphertext,
the first ciphertext being different than the second ciphertext.

10. The system of claim 9, comprising:
a second data buffer to store the first ciphertext and the second ciphertext; and
a decryption module to:
use the key and a particular decryption algorithm to:
decrypt the first ciphertext to produce the first plaintext, and
decrypt the second ciphertext to produce the second plaintext.

11. The system of claim 9, further comprising:
a random data generator to produce the first random data and the second random data,
where the first random data is different than the second random data, where the first data buffer is further to:
store the first random data at a first location identified by a first buffer pointer, and
store the second random data at a second location identified by a second buffer pointer; and
where, when encrypting the first plaintext, the encryption module is further to:
segment the first plaintext, including the first random data, into the plurality of data segments,
segmenting the first plaintext being based on the first pointer and a number of bits associated with the first plaintext.

12. The system of claim 9, where the encryption module is further to:
segment the first plaintext into the plurality of data segments,
alter the key to obtain a different key value for each data segment of the plurality of data segments, and
determine a different cipher value for each data segment of the plurality of data segments based on a respective different key value.

13. The system of claim 12, where the encryption module is further to use the key to encrypt the first plaintext to produce the first ciphertext based on the different cipher value determined for each data segment of the of the plurality of data segments.

14. The system of claim 13, where the plurality of data segments are a plurality of first data segments,
where the encryption module is further to:
segment the second plaintext into a plurality of second data segments,
alter the key to obtain a different key value for each second data segment of the plurality of second data segments of the second plaintext, and
determine a different cipher value for each second data segment of the plurality of second data segments of the second plaintext, based on a respective different key value.

15. The system of claim 14, where the encryption module is further to use the key to encrypt the second plaintext to obtain the second ciphertext based on the different cipher value for each second data segment of the plurality of second data segments.

16. A method, comprising:
obtaining, by a device, plaintext and an encryption key;
appending, by the device, randomized data to the plaintext;
encrypting, by the device and based on the encryption key, the plaintext, including the randomized data, to produce ciphertext,
the encrypting the plain text including iteratively encrypting a plurality of data segments of the plaintext, an iteration of encrypting a data segment of the plurality of data segments including:
  determining a first value based on the encryption key and the data segment of the plaintext,
  determining whether the first value comprises more than a threshold quantity of bits,
  reducing the first value to comprise the threshold quantity of bits when the first value comprises more than the threshold quantity of bits to form a second value,
  adding a predetermined value, to the first value, to obtain a third value when the first value does not comprise more than the threshold quantity of bits,
  determining whether the third value comprises more than the threshold quantity of bits, and
  reducing the third value to comprise the threshold quantity of bits to obtain a fourth value when the third value comprises more than the threshold quantity of bits,
    the ciphertext including a cypher value for the data segment, the cypher value comprising:
      the second value when the first value comprises more than the threshold quantity of bits,
      the third value when the third value does not comprise more than the threshold quantity of bits, or
      the fourth value when the third value comprises more than the threshold quantity of bits.

17. The method of claim 16, further comprising: generating the randomized data based on a time at which the randomized data is generated.

18. The method of claim 16, further comprising:
  storing the randomized data at a location identified by a pointer to append the randomized data to an end of the plaintext;
  segmenting the plaintext, including the randomized data, into the plurality of data segments based on the pointer and a quantity of bits associated with the plaintext;
  altering the encryption key to obtain a different key value for each data segment of the plurality of data segments; and
  determining a different cipher value for each data segment, of the plurality of data segments, based on the different key value obtained for the data segment.

19. The method of claim 18, where encrypting the plaintext to produce the ciphertext further comprises:
  using the encryption key to encrypt the plurality of data segments based on the different cipher value determined for each data segment of the plurality of data segments.

* * * * *